United States Patent [19]
Zody et al.

[11] Patent Number: 5,179,083
[45] Date of Patent: * Jan. 12, 1993

[54] COATING COMPOSITION CONTAINING AS THICKENERS POLYGALACTOMANNANS MODIFIED WITH HYDROPHILIC AND HYDROPHOBIC GROUPS

[75] Inventors: George M. Zody; Michael E. Morgan, both of Louisville, Ky.

[73] Assignee: Stein, Hall & Co., Inc., Jeffersontown, Ky.

[*] Notice: The portion of the term of this patent subsequent to Sep. 26, 2006 has been disclaimed.

[21] Appl. No.: 548,120

[22] Filed: Jul. 5, 1990

[51] Int. Cl.$^5$ .................. C08L 5/00; C08B 37/00; C07H 15/04; A61K 31/70
[52] U.S. Cl. .................................... 514/54; 106/162; 514/23; 536/114; 536/120
[58] Field of Search .................. 536/114, 120; 514/54; 106/162

[56] References Cited

U.S. PATENT DOCUMENTS

| | | | |
|---|---|---|---|
| 2,523,708 | 9/1950 | Moe | 536/114 |
| 3,700,612 | 10/1972 | Fath et al. | 536/120 |
| 4,011,393 | 3/1977 | Trapasso | 536/114 |
| 4,076,930 | 2/1978 | Ellingboe et al. | 536/120 |
| 4,129,722 | 12/1978 | Iovine et al. | 536/114 |
| 4,870,167 | 9/1989 | Zody et al. | 536/114 |
| 4,960,876 | 10/1990 | Molteni et al. | 536/120 |

Primary Examiner—John W. Rollins
Assistant Examiner—Everett White
Attorney, Agent, or Firm—Herbert P. Price

[57] ABSTRACT

Water-borne coating compositions are made, using as a thickening agent, a polygalactomannan having both hydrophilic and hydrophobic substituents.

13 Claims, No Drawings

COATING COMPOSITION CONTAINING AS THICKENERS POLYGALACTOMANNANS MODIFIED WITH HYDROPHILIC AND HYDROPHOBIC GROUPS

CROSS REFERENCE

This application is related to U.S. Pat. No. 4,870,167, which issued Sep. 26, 1989.

BACKGROUND OF THE INVENTION

The field of art to which this invention pertains is thickeners for aqueous coating compositions.

Coating compositions based on aqueous dispersions of synthetic resins have been known for a considerable number of years. It is well known to those skilled in the art of formulating paints that various thickening agents can be added to the paint formulations to obtain desirable rheology properties. Compositions which have been used as thickening agents include starch, methyl cellulose, hydroxyethyl cellulose, treated bentonites, hydroxalkyl guar, and the like.

U.S. Pat. No.3,700,612 describes coating compositions made from aqueous dispersions of film-forming resins which contain, as thickeners, hydroxyalkyl ethers of polygalactomannans. According to the patent, coating compositions which contain hydroxyalkyl ethers of polygalactomannans can be applied without sagging or balling and exhibit excellent flow and leveling characteristics.

Our U.S. Pat. No. 4,870,167, describes hydrophobically modified nonionic polygalactomannan ethers and their use in water borne coatings.

European patent application No. 323,627 discloses water paints formulated with polygalactomannans modified with hydrophilic and hydrophobic groups.

SUMMARY OF INVENTION

This invention is directed to coating compositions based on aqueous dispersions of film-forming resins. In particular, this invention pertains to water-borne coating compositions thickened with hydrophilic-hydrophobic ethers of a polygalactomannan.

The composition of this invention is a coating composition made from an aqueous dispersion of a film-forming synthetic resin, pigments, fillers, and thickening agents which are poly(alkyl ethers) of polygalactomannans having at least two different alkyl ether substituents. One alkyl substituent is selected from the group consisting of R— and $HOR^1$— wherein R is an alkyl group containing one to four carbon atoms, wherein $R^1$ is an alkylene group containing two to four carbon atoms and wherein the OH group is on the carbon atom beta to the ether group. The other alkyl substituent is selected from the group consisting of $R^2$, $HOR^3$, and

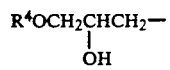

wherein $R^2$ is an alkyl group which contains about 8 to about 28 carbon atoms, wherein $R^3$ is an alkylene group which contains about 8 to about 28 carbon atoms having the OH group on the carbon atom beta to the ether group and wherein $R^4$ is an alkyl group containing about 5 to about 25 carbon atoms. The first alkyl ether substituent, i.e., R— and $HOR^1$—, is present in a M.S.(molecular substitution) of about 0.2 to about 2. The second alkyl ether substituent, i.e., $R^2$, $HOR^3$ and

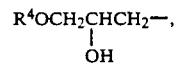

is present in a M.S. of about 0.001 to about 0.2.

The molecular weight of the mannan polymer is reduced by a factor of about 2 to about 10. The coating composition contains about 0.1 to about 2 weight percent of the poly(alkyl ether) wherein said weight percents are based on the total weight of the coating composition.

DESCRIPTION OF INVENTION

The coating compositions of this invention, which are based on aqueous dispersions of film-forming synthetic resins, are commonly referred to as latex paints. When formulated, such paints contain latex (the aqueous film-forming resin dispersions), dispersant, antifoaming agents, pigments, coalescing aids, thickeners, wetting agents and preservatives.

Latices which are useful in this invention are any of the well know compositions, examples of which are vinyl acetate homopolymers and copolymers; acrylate ester homopolymers and copolymers, e.g., polyethyl acrylate; methacrylate ester homopolymers and copolymers, e.g., polymethyl methacrylate; and styrene-butadiene copolymers. Generally, the latices contain about 30 to about 70 weight percent polymer based on the weight of the latex.

Latex paints are well known to those skilled in the art and are described in "Encyclopedia of Polymer Science and Technology," Vol. 8, 181-182 (1968) which is hereby incorporated by reference.

Thickening agents are used in latex paint formulations to adjust the viscosity and to modify the rheology so as to obtain suitable flow, leveling, and sag control in the paint. Thickening agents used in this invention contain both hydrophilic substituents and hydrophobic substituents which associate (form networks) when hydrated in water or in the latex paint formulations. The association or network that is formed imparts a rheology to the paint which is more newtonian and less thixotropic than conventional thickeners, thereby imparting improved properties, such as in flow and leveling, sag resistance and decreased spatter when applied by a roller.

The thickening agents used in this invention are described in detail with one difference, in U.S. Pat. No. 4,870,167, which is hereby incorporated by reference. The difference is that the compositions as described in the patent are reduced in this invention in molecular weight by a factor of about 2 to about 10, preferably about 4 to about 6. This reduction in molecular weight is accomplished by well known method used to reduce the viscosity cf polysaccharides.

The polygalactomannans used in this invention are high molecular weight polysaccharides which are essentially straight chain polymannans branched at regular intervals with single membered galactose units. The mannose units are linked to each other by means of beta (1-4) glycosidic linkages. The molecular weight of polygalactomannans is difficult to determine with 100 percent accuracy due to the fact that the gums are natural products which contain impurities which interfere with the molecular weight determinations. However, it is commonly accepted that the molecular weight of guar gum is within the range of about 1,500,000 to about 3,000,000.

The reduction in molecular weight of polygalactomannans is accomplished by scission of the glycosidic linkage. This can be done by treatment with hydrogen peroxide, U.S. Pat. No. 2,767,167; peracetic acid, U.S. Pat. No. 2,803,558; mineral acids, U.S. Pat. Nos. 2,086,701 and 2,393,095; chemical or enzymatic oxidation, U.S. Pat. No. 3,890,171; or heat, U.S. Pat. No. 2,553,485. All of the listed patents are hereby incorporated by reference.

When the compositions described in U.S. Pat. No. 4,870,167 are used as thickening agents without depolymerization, the resulting paints have poor flow and leveling properties, and the spattering when the paint is applied with a roller is difficult to control. It is difficult to formulate paints having workable and practical viscosities. However, when the molecular weight is reduced by at least a factor of 2, i.e., to less than 1,000,000, improvements in paint properties are obtained. The molecular weights of the thickening agents used in this invention, will vary from about 150,000 to about 1,000,000, and preferably about 250,000 to about 500,000. The viscosities of the underivatized polygalactomannan or the polygalactomannan containing the hydrophilic substituent before being derivatized with the hydrophobic substituent at a 2 weight percent solution in water will be about 100 cps to about 2000 cps at 25° C., and preferably about 600 to about 1500 cps. The viscosity of the polygalactomannan or hydrophilic substituted polygalactomannan prior to depolymerization is greater than 10,000 cps as measured as a 2 weight percent aqueous solution.

The depolymerization reaction can be conducted on the polysaccharide, on the polysaccharide which contains the hydrophilic ether substituent, or on the double derivatizied composition. Preferably, the depolymerization is conducted on the hydrophilic substituted polysaccharide.

The thickening agents used in this invention are made by reacting the polygalactomannan, depolymerized or not, with a lower alkyl halide or alkylene oxide using the procedure described in U.S. Pat. No. 4,870,167. The resulting product useful in this invention has a M.S. of about 0.2 to about 2.0. The preferred derivative is hydroxypropyl guar having a M.S. of about 0.6 to about 1.5.

The hydrophilic substituted derivative is then reacted with a long chain epoxy compound or alkyl halide having a carbon content of about 8 to about 28 carbon atoms as described in U.S. Pat. No. 4,870,167. The hydrophilic substituent is present in M.S. of 0.001 to about 0.2. Preferred substituents contain 10 to 18 carbon atoms and are present in a M.S. of about 0.005 to about 0.1.

The thickening agent is used in the coating compositions of this invention in the amount of about 0.1 to about 2 weigh percent based on the total weight of the coating composition and, preferably about 0.25 to about 0.75 weight percent.

The following examples describe the invention in detail. Parts and percentages are by weight unless otherwise designated.

EXAMPLE 1

To a suitable reactor equipped with an agitator are added 10 parts of finely divided silica. Agitation is begun and 10 parts of a 50 percent aqueous hydrogen peroxide solution are added to the reactor. Agitation is continued until all of the peroxide solution is thoroughly mixed with and absorbed by the silica.

To another reactor are added 500 parts of hydroxypropyl guar having a M.S. of 1.2. The peroxide-silica mix is then slowly added to the reactor with stirring. An additional 500 parts of the hydroxypropyl guar are then added and mixing is continued. The reactor contents are then placed in a container which is sealed. The container is placed in a roller oven heated at 175° F. Rolling and heating are continued for 7 hours. At the end of the heating period, no peroxide is detected in the product.

The oxidized hydroxypropyl guar, 8 parts, is added to 400 parts of water and the pH is adjusted to 6.0 with hydrochloric acid. After agitating for one hour, the viscosity is 1,340 cps, at 25° C., Brookfield Spindle No. 2 at 20 RPM. After 24 hours the viscosity is still 1,340.

EXAMPLE 2

To a suitable reactor are added 300 parts of isopropanol, 2 parts of ammonium lauryl sulfate, and 18 parts of 1,2-epoxyhexadecane. When thoroughly mixed, 90 parts of the oxidized hydroxypropyl guar from Example 1 are added. A nitrogen sparge is applied for 15 minutes. Potassium hydroxide, 3.15 parts, is added and heat is applied raising the temperature to 70° C. The temperature is held at 70° C. for 2.5 hours while agitating the components in a nitrogen atmosphere. The reactants are cooled to room temperature and the liquid is decanted from the solid guar derivative. The derivatized guar is washed twice with acetone and is allowed to air dry.

A 2 percent aqueous solution of the derivatized product has a viscosity of 20,000 cps.

EXAMPLE 3

To a suitable container are added 28 parts of 1,2-propylene glycol, 17.5 parts of water, 3 parts of a 25 percent solution in water of sodium polyacrylate, 125 parts of titanium dioxide and 19 parts of clay filler. The mixture is ground on a high speed disperser for 20 minutes to obtain a Hegman grind of at least 6. To the pigment grind are then added 12 parts of propylene glycol, 22 parts of water, 230 parts of a latex of polyethyl acrylate at about 50 percent in water, 0.3 part of trimethylpentanedirl monisobutyrate, 2.5 parts of defoamer and 58 parts of a 2 percent solution in water of a hydrophilic-hydrophobic guar derivative prepared as described in the preceding examples. The components are thoroughly mixed forming a white semi-gloss paint.

The paint has a viscosity of 77 Kreb Units, exhibits excellent sag resistance and acceptable hiding, leveling and gloss properties with very little spatter when applied with a roller.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a coating composition comprised of an aqueous dispersion of a film-forming synthetic resin, pigments, and fillers, the improvement which comprises using as a thickening and rheology control agent about 0.1 to about 2 weight percent of the composition of a poly(alkl ether) of a polygalactomannan having two different alkyl ether substituents wherein one alkyl ether substituent is a hydrophilic group selected from the group consisting of R and $HOR^1$, wherein R is an alkyl group containing one to four carbon atoms, wherein $R^1$ is an alkylene group containing two to four carbon atoms and wherein the OH group is on the carbon atom beta to the ether group, wherein the other alkyl substituent is a hydrophobic group selected from the group consisting of $R^2$, $HOR^3$, and

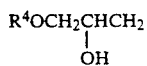

wherein $R^2$ is an alkyl group containing about eight to about twenty-eight carbon atoms, wherein $R^3$ is an alkylene group which contains about 8 to about 28 carbon atoms having the OH group on the carbon atom beta to the ether group and wherein $R^4$ is an alkyl group containing about 5 to about 25 carbon atoms, wherein the substituent, R or $HOR^1$, is present in a M.S. of about 0.2 to about 2, wherein the substituent, $R^2$, $HOR^3$, or

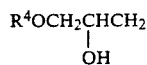

is present in a M.S. of about 0.001 to about 0.2 and wherein the viscosity of the polygalactomannan prior to derivatization with the hydrophobic group has a viscosity as measured as a 2 weight percent solution in water at 25° C. of about 100 to about 2000 cps.

2. The composition of claim 1 wherein the thickening agent is present in the amount of about 0.25 to about 0.75 weight percent.

3. The composition of claim 1 wherein the polygalactomannan is guar gum.

4. The composition of claim 1 wherein the polygalactomannan is locust bean gum.

5. The composition of claim 1 wherein R is methyl.

6. The composition of claim 1 wherein $HOR^1$ is hydroxypropyl.

7. The composition of claim 1 wherein $HOR^3$ is hydroxydodecyl.

8. The composition of claim 1 wherein $HOR^3$ is hydroxyhexadecyl.

9. The composition of claim 1 wherein $HOR^3$ is hydroxyoctadecyl.

10. The composition of claim 1 wherein the M.S. of the substituents R or $HOR^1$ is about 0.6 to about 1.5.

11. The composition of claim 1 wherein the M.S. of the substituent, $R^2$, $HOR^3$ or

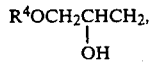

is about 0.005 to about 0.10.

12. The composition of claim 1 wherein the molecular weight of the poly(alkylether) of a polygalactomannan has been reduced to about 250,000 to about 500,000.

13. The composition of claim 1 wherein the viscosity is about 600 to about 1500 cps.

* * * * *